(12) United States Patent
Nakanishi

(10) Patent No.: US 9,950,642 B2
(45) Date of Patent: Apr. 24, 2018

(54) PINCHING DETECTION APPARATUS OF VEHICLE SEAT

(71) Applicant: Aisin Seiki Kabushiki Kaisha, Kariya-shi (JP)

(72) Inventor: Ryota Nakanishi, Obu (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 1 day.

(21) Appl. No.: 14/925,292

(22) Filed: Oct. 28, 2015

(65) Prior Publication Data

US 2016/0114702 A1    Apr. 28, 2016

(30) Foreign Application Priority Data

Oct. 28, 2014   (JP) .................................. 2014-219338

(51) Int. Cl.
*B60N 2/00*   (2006.01)
*B60N 2/02*   (2006.01)

(52) U.S. Cl.
CPC .............. *B60N 2/002* (2013.01); *B60N 2/02* (2013.01)

(58) Field of Classification Search
None
See application file for complete search history.

(56) References Cited

U.S. PATENT DOCUMENTS

| 7,239,950 | B2 | 7/2007 | Wanami et al. |
| 7,831,359 | B2 | 11/2010 | Sugawara et al. |
| 2006/0106517 | A1* | 5/2006 | Bujak ................... B60N 2/002 701/45 |
| 2016/0096498 | A1* | 4/2016 | Kubota ............. B60R 21/01546 73/1.15 |

FOREIGN PATENT DOCUMENTS

| JP | 2005-233821 | 9/2005 | |
| JP | 2006-44416 | 2/2006 | |
| JP | 2008-18863 | 1/2008 | |
| JP | 2016074339 A | * 10/2014 | ......... B60R 21/0152 |

* cited by examiner

*Primary Examiner* — Lail A Kleinman
(74) *Attorney, Agent, or Firm* — Oblon, McClelland, Maier & Neustadt, L.L.P.

(57) ABSTRACT

A pinching detection apparatus of a vehicle seat includes: a reverse load determining unit that determines whether or not a vehicle seat is in a reverse load state in which the vehicle seat is lifted upward based on a seat load detected by a load sensor provided on a lower side of the vehicle seat; and a pinching determining unit that determines that a foreign material is pinched on the lower side of the vehicle seat when determining that the vehicle seat is continuously in the reverse load state.

14 Claims, 5 Drawing Sheets

| | THRESHOLD CORRECTING DIRECTION | |
|---|---|---|
| FORWARD INCLINATION | REGION α | REGION β |
| | (+) | (+) |
| | REGION γ | REGION δ |
| | (-) | (-) |
| BACKWARD INCLINATION | REGION α | REGION β |
| | (-) | (-) |
| | REGION γ | REGION δ |
| | (+) | (+) |
| LEFTWARD INCLINATION | REGION α | REGION β |
| | (+) | (-) |
| | REGION γ | REGION δ |
| | (+) | (-) |
| RIGHTWARD INCLINATION | REGION α | REGION β |
| | (-) | (+) |
| | REGION γ | REGION δ |
| | (-) | (+) |

PINCHING DETECTION APPARATUS OF VEHICLE SEAT

CROSS REFERENCE TO RELATED APPLICATIONS

This application is based on and claims priority under 35 U.S.C. § 119 to Japanese Patent Application 2014-219338, filed on Oct. 28, 2014 the entire contents of which are incorporated herein by reference.

TECHNICAL FIELD

This disclosure relates to a pinching detection apparatus of a vehicle seat.

BACKGROUND DISCUSSION

In general, a load sensor is provided on a lower side of a vehicle seat. Since a sitting state of an occupant is detected on the basis of a seat load which is detected by the load sensor, safety measures are performed such as prompting the occupant who is sitting in the vehicle seat to fasten a seat belt or changing a development control of an air bag depending on the occupant.

In addition, for example, an occupant detection apparatus disclosed in JP 2008-18863A (Reference 1) does not detect the sitting state based on the seat load in a case in which a sum of a change amount (absolute value) of the seat load detected by a plurality of the load sensors is equal to or more than a predetermined threshold. Further, an occupant detection apparatus disclosed in JP 2005-233821A (Reference 2) detects the sitting state in only a case in which the detected seat load is in a predetermined range which is set in advance. Accordingly, accuracy at the time of detecting the sitting state is increased, and reliability thereof is improved.

However, usually, the load sensor provided on the lower side of the vehicle seat detects the seat load based on the pressure to the vehicle seat which is applied downward when the occupant sits down. For this reason, in a state in which a foreign material is pinched on the lower side of the vehicle seat, there is a problem in that an accurate seat load is not easily detected. Accordingly, there is a concern that an error occurs in a result of the detected sitting state, and thus, there is room for improvement on this point.

SUMMARY

Thus, a need exists for a pinching detection apparatus of a vehicle seat which is not suspectable to the drawback mentioned above.

A pinching detection apparatus of a vehicle seat according to an aspect of this disclosure preferably includes a reverse load determining unit that determines whether or not a vehicle seat is in a reverse load state in which the vehicle seat is lifted upward based on a seat load detected by a load sensor provided on a lower side of the vehicle seat, and a pinching determining unit that determines that a foreign material is pinched on the lower side of the vehicle seat when it is determined that the vehicle seat is continuously in the reverse load state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
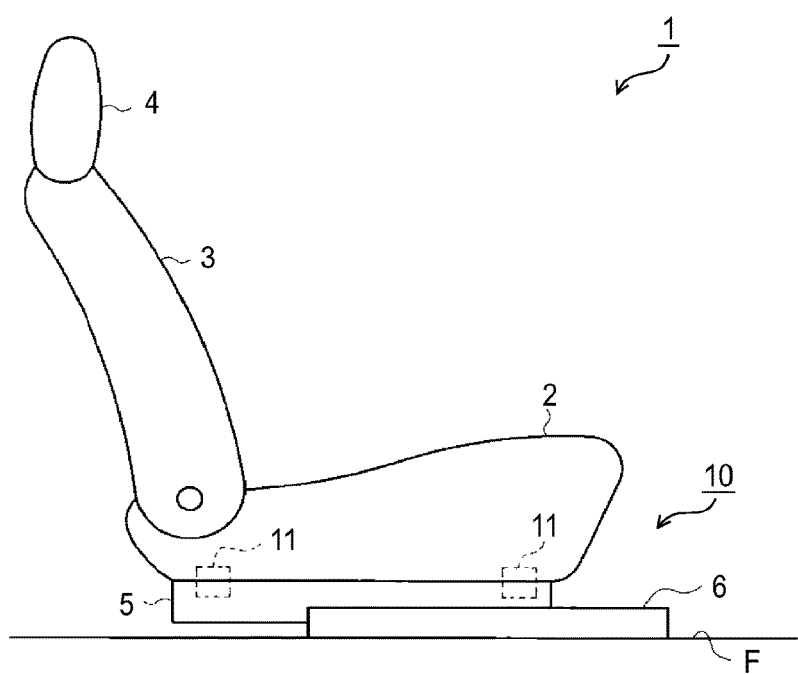
FIG. 1 is a side view of a vehicle seat.

Hereinafter, an embodiment of a pinching detection apparatus of a vehicle seat will be described with reference to drawings. As illustrated in FIG. 1, a seat 1 for vehicle includes a seat cushion 2 and a seat back 3 which is provided to be capable of being inclined on a rear end portion of the seat cushion 2. Also, a headrest 4 is provided on an upper end of the seat back 3.

In the embodiment, a pair of right and left lower rails 6 extending in a forward and rearward direction of the vehicle is provided on a bottom portion F of the vehicle. In addition, upper rails 5 which are relatively movable on the lower rails 6 along an extending direction are mounted on each of the lower rails 6, respectively. Also, the seat 1 of the embodiment is supported on a seat slide apparatus 10 in which each lower rail 6 and each upper rail 5 are formed.

Figure 2:
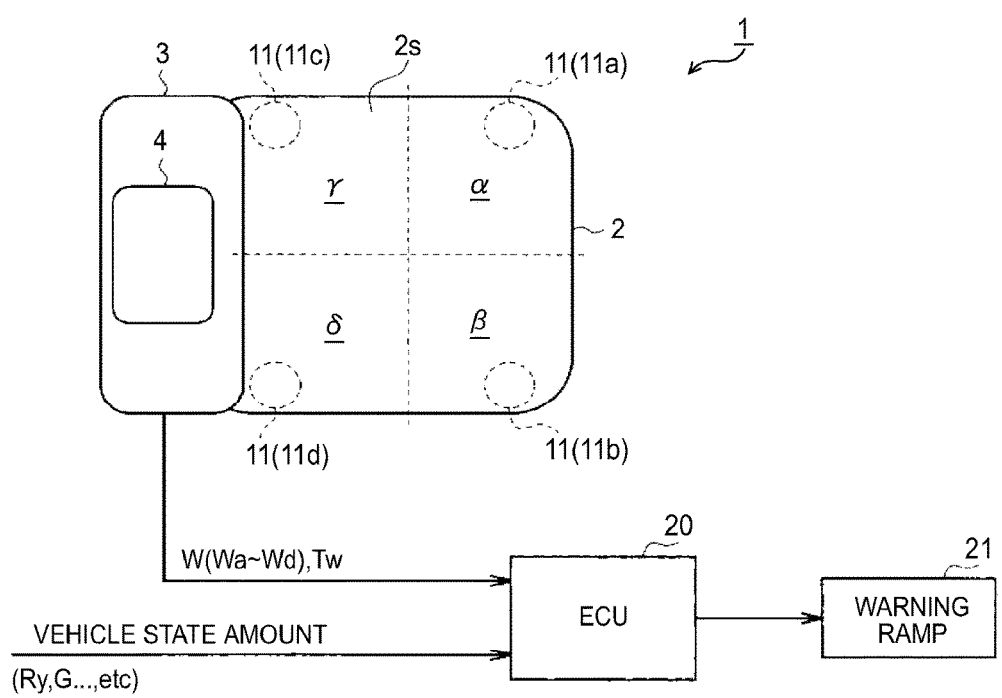
FIG. 2 is a schematic configuration diagram illustrating a load sensor provided on a lower side of the vehicle seat and an ECU as a pinching detection apparatus.

In addition, as illustrated in FIG. 1 and FIG. 2, in the embodiment, a plurality of load sensors 11 are provided on the lower side of the seat 1. Specifically, the load sensors 11 (11a to 11d) are provided between the upper rail 5 constituting the seat slide apparatus 10 and the seat 1 supported on the upper rail 5. Moreover, a well-known strain sensor is used for the load sensor 11. Also, the load sensors 11 are respectively disposed at each position corresponding to four corners of a seat sitting surface 2s which is substantially a rectangular shape in a state of being supported on the upper rail 5.

As illustrated in FIG. 2, an output signal of each of the load sensors 11 is input to an ECU 20 as a seat control apparatus and an occupant detection apparatus. Accordingly, in the embodiment, a seat load W of the seat 1 in which each of the load sensors 11 is provided is detected.

Specifically, based on the output signal of each of the load sensors 11a to 11d the ECU 20 of the embodiment detects seat loads Wa to Wd, which are generated in four regions in which each of the load sensors 11a to 11d is provided, that is, in regions $\alpha$, $\beta$, $\gamma$, and $\delta$ where the seat sitting surface 2s is divided into four sections of front, rear, right, and left. In addition, the ECU 20 detects the sitting state of the seat 1 based on the detected seat loads W (Wa to Wd). Also, based on the result of the detected sitting state, the ECU 20 of the embodiment outputs a notification for prompting the occupant who sits on the seat 1 to fasten a seat belt, or an instruction for prompting the occupant to change a mode of a development control of the air bag.

Moreover, in the embodiment, the notification output by the ECU 20 is performed through a warning lamp 21, a speaker (illustration omitted), or the like of the vehicle in which an instrument panel (not illustrated) is provided. Accordingly, the occupant is prompted to correct causes of the generation and outputting of the notification through his or her vision and hearing.

In addition, based on the seat loads Wa to Wd respectively detected by the load sensors 11a to 11d the ECU 20 of the embodiment determines whether or not a foreign material is pinched on the lower side of the seat 1, specifically, between the seat cushion 2 and a bottom portion F of the vehicle. Also, when the pinched foreign material is detected, the occupant is prompted to remove the foreign material pinched on the lower side of the seat 1 by outputting a notification such as turning on the warning lamp 21.

Described in further detail, the ECU 20 of the embodiment calculates a total value TW of the seat loads Wa to Wd detected by each of the load sensors 11a to 11d and compares the total value TW with a predetermined threshold W0, thereby determining whether or not the seat is in a reverse load state (negative load state) in which the seat 1 is lifted upward. Specifically, the threshold W0 used for determining the reverse load state is set to be lower than a reference value when the occupant does not sit on the seat 1, that is, the value when the sitting load is "0". In addition, the ECU 20 determines that the seat 1 is in the reverse load state, when the total value TW of the seat loads Wa to Wd is lower than the threshold W0. Also, the ECU 20 determines that the foreign material is pinched on the lower side of the seat 1 when the reverse load state continues over the predetermined time t0.

That is, the seat 1 is lifted upward because the foreign material is pinched on the lower side thereof (reverse load state). At this time, when the occupant does not sit on the seat 1, the seat load W detected by each of the load sensors 11 provided on the lower side of the seat 1 is below the reference value corresponding to the sitting load "0".

However, the reverse load state is, for example, a phenomenon which can be caused by an acceleration change in a vertical direction at the time of driving the vehicle, other than a case in which the foreign material is pinched thereon. In view of the above description, the ECU 20 of the embodiment determines that the foreign material is pinched on the lower side of the seat 1 when it is determined that the seat 1 continues to be in the reverse load state. Accordingly, in a simple configuration, the pinched foreign material on the lower side of the seat 1 can be accurately detected.

Figure 3:
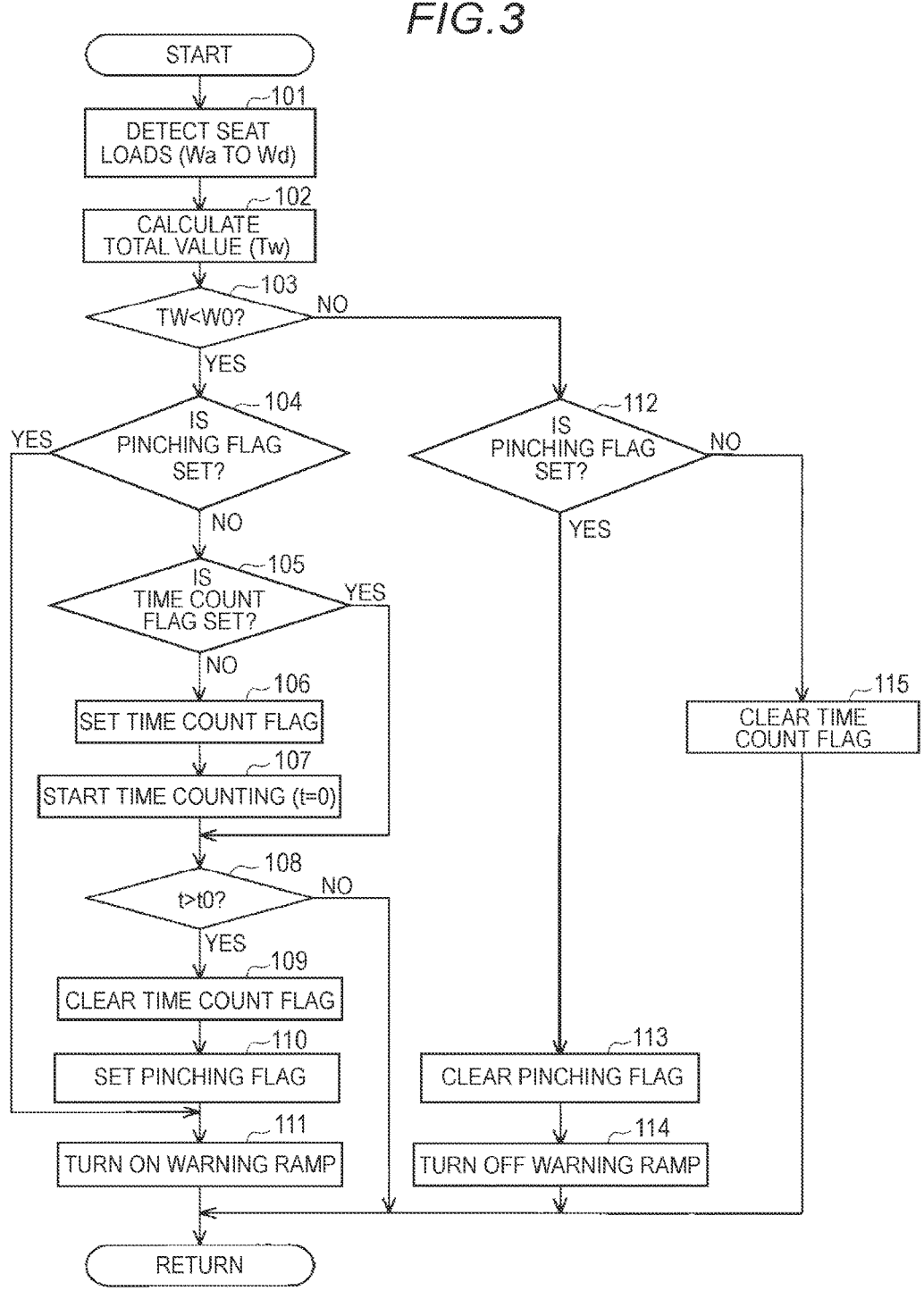
FIG. 3 is a flow chart illustrating a processing procedure of pinching detection.

Next, a processing procedure for pinching detection by the ECU 20 will be described. As illustrated in a flow chart of FIG. 3, the ECU 20 detects the seat loads Wa to Wd based on the output signal of each of the load sensors 11a to 11d (Step 101). When the total value TW of the seat loads Wa to Wd is calculated (Step 102), subsequently, the ECU 20 determines whether or not the total value TW is below the predetermined threshold W0 (Step 103). Also, when the total value TW of each of the seat loads Wa to Wd is below the threshold W0 (TW<W0, Step 103: YES), the ECU 20 determines whether or not a pinching flag is set which indicates that the foreign material pinched on the lower side of the seat 1 is detected in advance (Step 104).

When the ECU 20 determines that a pinching flag is not set in Step 104 (Step 104: NO), the ECU 20 determines whether or not a time count flag is set (Step 105). Also, when the time count flag is not set in Step 105 (Step 105: NO), the time count flag is set (Step 106), and the ECU 20 starts to count a continuing time in a state in which the total value TW of each of the detected seat loads Wa to Wd is below the threshold W0, that is, the continuing time in the reverse load state (t=0 Step 107).

Meanwhile, when it is determined that the time count flag is set in advance in Step 105 (Step 105: YES), the ECU 20 determines whether or not the measurement time t in the reverse load state exceeds the predetermined time t0 which is set in advance (Step 108) without performing processes in Step 106 and Step 107. When the measurement time t exceeds the predetermined time t0 (t>t0, Step 108: YES), the ECU 20 clears the time count flag (Step 109), and sets the pinching flag (Step 110).

Moreover, when the measurement time t does not reach the predetermined time t0 in Step 108 (Step 108: NO), the ECU 20 does not perform processes in Step 109, Step 110, and Step 111 to be described later. When it is determined that the pinching flag is set in advance in Step 104 (Step 104: YES), the ECU 20 does not perform the processes in Step 105 to Step 110.

That is, in the ECU 20 of the embodiment, by setting the pinching flag, a state in which the foreign material pinched on the lower side of the seat 1 is detected is maintained. When the pinching flag is set in advance (Step 104: YES) after setting the pinching flag (Step 110), the ECU 20 notifies that the pinched foreign material is detected by turning on the warning lamp 21 (Step 111).

In addition, even when it is determined that the total value TW of each of the seat loads Wa to Wd is equal to or more than the threshold W0 in Step 103 (TW≥W0, Step 103: NO), the ECU 20 of the embodiment determines whether or not the pinching flag is set (Step 112). Also, when the pinching flag is set (Step 112: YES), the ECU 20 clears the pinching flag (Step 113), and turns the warning lamp 21 off (Step 114).

Moreover, when it is determined that the pinching flag is not set in Step 112 (Step 112: NO), the ECU 20 does not perform processes in Step 113 and Step 114. Also, the ECU 20 clears the time count flag in Step 115.

Hitherto, according to the embodiment, effects as follows can be obtained.

(1) The ECU 20 as the pinching detection apparatus determines whether or not the total value TW of the seat loads Wa to Wd detected by each of the load sensors 11a to 11d is below the predetermined threshold W0 (reverse load determining unit, Step 103). Also, when the reverse load state in which the total value TW of the seat loads Wa to Wd is below the threshold W0 continues beyond the predetermined time t0 (Step 108: YES), the ECU 20 determines that the foreign material is pinched on the lower side of the seat and sets the pinching flag (pinching determining unit, Step 105 to Step 110).

That is, the seat 1 is lifted upward when the foreign material is pinched on the lower side of the seat. The reverse load state continues until the foreign material pinched on the lower side of the seat 1 is removed. Accordingly, according to the above configuration, in a simple configuration, the foreign material pinched on the lower side of the seat 1 can be accurately detected.

(2) In addition, when determining whether or not the seat is the reverse load state in which the seat 1 is lifted upward (negative load state), the ECU 20 can accurately determine whether or not the seat 1 is in the reverse load state, using the total value TW of the seat loads Wa to Wd detected by each of the load sensors 11a to 11d to suppress an influence of the inclination of the vehicle such as a sloped road. Accordingly, the accuracy of pinching detection can be further improved.

(3) Further, it is determined that the seat 1 is continuously in the reverse load state when the reverse load state continues beyond the predetermined time t0, and thus, the influence of the acceleration change in the vertical direction which is generated, for example, at the time of driving the vehicle, can be suppressed. Accordingly, the accuracy of pinching detection can be further improved.

Moreover, the above described embodiment may be modified as follows.

In the embodiment, when the reverse load state, in which the total value TW of the seat loads Wa to Wd detected by each of the load sensors 11a to 11d is below the predetermined threshold W0, continues beyond the predetermined time t0, the ECU 20 determines that the foreign material is pinched on the lower side of the seat.

Figure 4:
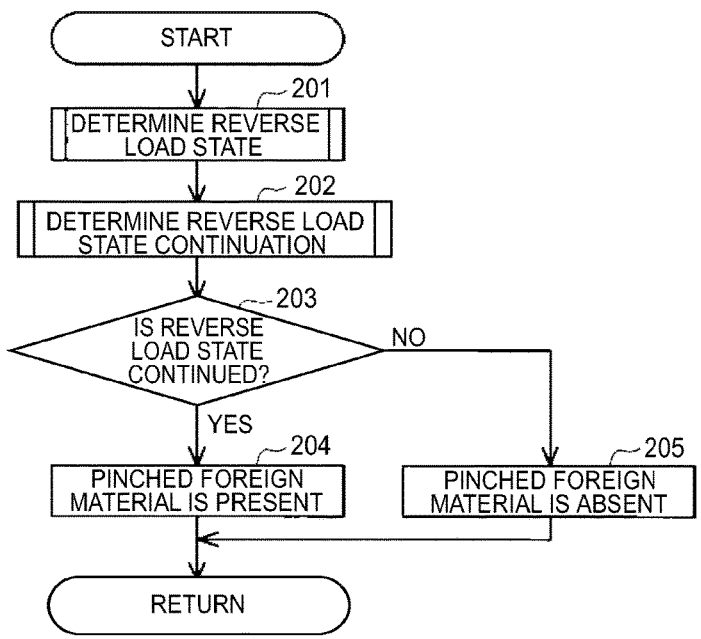
FIG. 4 is a flow chart illustrating the other processing procedure of pinching detection.

However, it is not limited thereto, and as illustrated in a flow chart of FIG. 4, first, a determination process determining whether or not the seat 1 is in the reverse load state in which the seat 1 is lifted upward is performed (reverse load state determination, Step 201). Next, a determination process determining whether or not the reverse load state continues is performed (reverse load state continuation determination, Step 202). Also, based on a determination result of the reverse load state continuation determination, as long as a configuration is used in which the foreign material pinched on the lower side of the seat 1 is detected (Step 203 to Step 205), contents of the reverse load state determination and the reverse load state continuation determination may be changed arbitrarily.

Figure 5:
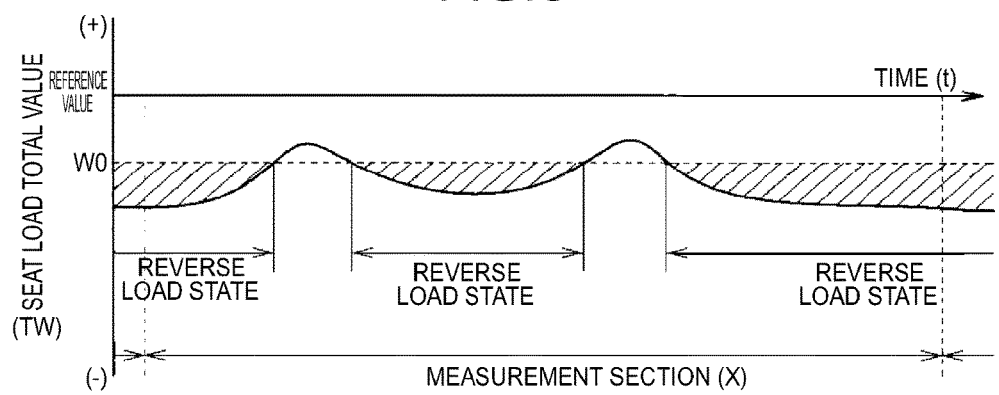
FIG. 5 is an explanation diagram illustrating determination that the other reverse load state continues.

Specifically, in the reverse load state continuation determination, a condition in which the reverse load state continues without being disconnected may not be essential. For example, as illustrated in FIG. 5, when the seat 1 is in the reverse load state for a predetermined ratio or more in a predetermined measurement period X, it may be determined that the seat 1 is continuously in the reverse load state. Accordingly, more preferably, the influence of the acceleration change in the vertical direction which is generated, for example, at the time of driving the vehicle, can be suppressed.

In addition, even when performing the reverse load state determination, the total value TW may not be necessarily used, and for example, an average value (AVV) of the seat loads Wa to Wd detected by each of the load sensors 11a to 11d may be used. Also, the total value TW and the average value (AVV) may be combinedly used.

The number of each load sensor 11 and disposing thereof may be changed arbitrarily. For example, when the seat sitting surface 2s is divided into two in a vehicle width direction, the two load sensors 11 corresponding to a region of the center side of the vehicle width direction (refer to FIG. 2, any one of regions a and regions γ or β and δ) may be disposed so as to be separated in a forward and rearward direction. Also, when the seat sitting surface 2s is divided into two in the forward and rearward direction of the vehicle, the two load sensors 11 corresponding to a region of a rear side (refer to FIG. 2, regions γ and δ) may be disposed so as to be separated in the vehicle width direction.

In addition, as described above embodiment, when the seat loads Wa to Wd in each of the regions α, β, γ, and δ in which the load sensors 11a to 11d are provided can be detected by each of the load sensors 11a to 11d the reverse load state determination may be performed in each of the regions α, β, γ, and δ in which the load sensors 11a to 11d are provided. Accordingly, a position in which the foreign material is pinched can be specified.

Further, for example, when the load sensor 11 is disposed at a deviation position such as the center side of the vehicle width direction of the seat 1 (refer to FIG. 2, any one of regions α and γ or regions β and δ) or the rear side of the vehicle (refer to FIG. 2, regions γ and δ), or when the reverse load state determination is performed on a plurality of the regions described above, the threshold W0 used for determining the reverse load state may be appropriately corrected.

Figures 6, 7:
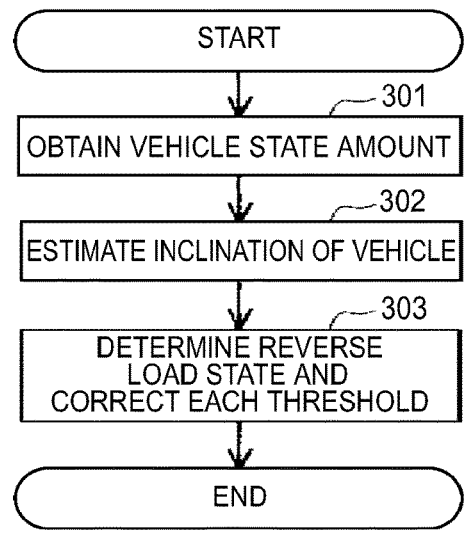
FIG. 6 is a flow chart illustrating a processing procedure of correcting a threshold based on estimation of an inclination of a vehicle and an estimated result thereof.
FIG. 7 is an explanation diagram illustrating an aspect of correcting the threshold based on the estimation of the inclination of the vehicle.

For example, as illustrated in a flow chart of FIG. 6, a vehicle state amount (for example, acceleration G, yaw rate Ry, or the like) correlating with a position of the vehicle is obtained from various sensors provided in the vehicle (Step 301), and the inclination of the vehicle is estimated based on the vehicle state amount (inclination estimation unit, Step 302). Also, based on the estimation result, the threshold W0 used for determining the reverse load state may be corrected for all of the regions α, β, γ, and δ where the reverse load state determination is performed. Accordingly, for example, by suppressing the influence of the inclination of the vehicle such as a sloped road, the accuracy of pinching detection can be further improved.

Specifically, as illustrated in FIG. 7, when the vehicle is inclined forward, the threshold W0 of the reverse load state determination correlating with the regions α and β positioned at the front side of the seat 1 is corrected in a plus direction, and the threshold W0 correlating with the regions γ and δ at the rear side is corrected in a minus direction. In addition, when the vehicle is inclined backward, in the other way of the above described vehicle which is inclined forward, the threshold W0 correlating with the regions α and β at the front side is corrected in the minus direction, and the threshold W0 correlating with the regions γ and δ at the rear side is corrected in the plus direction. Further, when the vehicle is inclined toward a left side of the vehicle, the threshold W0 correlating with the regions α and γ at a left side is corrected in the plus direction, and the threshold W0 correlating with the regions β and δ at a right side of the vehicle is corrected in the minus direction. Also, when the vehicle is inclined toward the right side of the vehicle, the threshold W0 correlating with the regions α and γ on the left side is corrected in the minus direction, and the threshold W0 correlating with the regions β and δ at a right side of the vehicle is corrected in the plus direction.

In addition, a correction amount of the threshold W0 in each of the regions α, β, γ, and δ is preferably a value according to the inclination of the vehicle which is estimated. Accordingly, the accuracy of pinching detection can be further improved.

Next, technical ideas which can be obtained from the above described embodiment will be described.

A pinching detection apparatus of a vehicle seat according to an aspect of this disclosure preferably includes a reverse load determining unit that determines whether or not a vehicle seat is in a reverse load state in which the vehicle seat is lifted upward based on a seat load detected by a load sensor provided on a lower side of the vehicle seat, and a pinching determining unit that determines that a foreign material is pinched on the lower side of the vehicle seat when it is determined that the vehicle seat is continuously in the reverse load state.

When the vehicle seat is in a state in which the foreign material is pinched on the lower side thereof, the vehicle seat is lifted upward. Such a reverse load state continues until the foreign material pinched on the lower side of the vehicle seat is removed. Accordingly, according to the above configuration, the foreign material pinched on the lower side of the vehicle seat can be accurately detected with a simple configuration,.

In the pinching detection apparatus of a vehicle seat, it is preferable that a plurality of the load sensors are provided on the lower side of the vehicle seat, and the reverse load determining unit determines whether either or both of a total value and an average value of the seat loads detected by the respective load sensors is below a predetermined threshold.

According to the above described configuration, it can be accurately determined whether or not the vehicle seat is in the reverse load state while suppressing influence of the inclination of the vehicle, such as a sloped road. Accordingly, accuracy of pinching detection can be further improved.

In the pinching detection apparatus of a vehicle seat, it is preferable that when the reverse load state continues beyond the predetermined time, the pinching determining unit determines that the vehicle seat is continuously in the reverse load state.

According to the above described configuration, an influence of the acceleration change in the vertical direction which is generated, for example, at the time of running of the vehicle can be suppressed. Accordingly, the accuracy of pinching detection can be further improved.

In the pinching detection apparatus of a vehicle seat, it is preferable that when the vehicle seat is in the reverse load state for a predetermined ratio or more in a predetermined measurement period, the pinching determining unit determines that the vehicle seat is continuously in the reverse load state.

In the pinching detection apparatus of a vehicle seat, it is preferable that on the lower side of the vehicle seat, the plurality of the load sensors are provided and the reverse load determining unit determines whether or not the vehicle seat is in the reverse load state in each region in which each of the load sensors is provided.

The pinching detection apparatus of a vehicle seat preferably further includes an inclination estimation unit that estimates an inclination of the vehicle, and a threshold correcting unit that corrects a threshold used for determining the reverse load state for every region where the reverse load state is determined, based on an estimation result obtained by the inclination estimation unit.

In the pinching detection apparatus of a vehicle seat, it is preferable that a correct amount of the threshold corrected by the threshold correcting unit is set in response to an inclined amount detected by the inclination estimation unit.

In the pinching detection apparatus of a vehicle seat, it is preferable that, when the seat is in the reverse load state for a predetermined ratio or more in a predetermined measurement period, the pinching determining unit determines that the vehicle seat is continuously in the reverse load state. With this configuration, the influence of the acceleration change in the vertical direction which is generated, for example, at the time of driving the vehicle, can be suppressed more preferably.

In the pinching detection apparatus of a vehicle seat, it is preferable that the plurality of the load sensors are provided on the lower side of the vehicle seat, and the reverse load determining unit determines whether or not the vehicle seat is in the reverse load state in each region in which each of the load sensors is provided. With this configuration, the position in which the foreign material is pinched can be specified.

It is preferable that the pinching detection apparatus of a vehicle seat further includes an inclination estimation unit which estimates an inclination of the vehicle, and a threshold correcting unit which corrects the threshold used for determining the reverse load state for every region where the reverse load state is determined, based on an estimation result by the inclination estimation unit. With this configuration, the accuracy of pinching detection can be further improved by suppressing influence of the inclination of the vehicle such as a sloped road.

In the pinching detection apparatus of a vehicle seat, it is preferable that a correct amount of the threshold corrected by the threshold correcting unit is set in response to an inclined amount detected by the inclination estimation unit.

According to the aspects of this disclosure, the pinching detection apparatus of a vehicle seat can accurately detect a foreign material pinched on a lower side of the vehicle seat with a simple configuration.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A pinching detection apparatus of a vehicle seat comprising:
    a reverse load determining unit that determines whether or not a vehicle seat is in a reverse load state in which the vehicle seat is lifted upward based on a seat load detected by a load sensor provided on a lower side of the vehicle seat; and
    a pinching determining unit that determines that a foreign material is pinched on the lower side of the vehicle seat when determining that the vehicle seat is continuously in the reverse load state,
    wherein when the vehicle seat is in the reverse load state for a predetermined ratio or more in a predetermined measurement period, the pinching determining unit determines that the vehicle seat is continuously in the reverse load state by counting a continuing time of the reverse load state.

2. The pinching detection apparatus of a vehicle seat according to claim 1,
    wherein a plurality of the load sensors are provided on the lower side of the vehicle seat, and
    wherein the reverse load determining unit determines whether either or both of a total value and an average value of seat loads detected by the respective load sensors is below a predetermined threshold.

3. The pinching detection apparatus of a vehicle seat according to claim 1,
    wherein when the reverse load state continues beyond a predetermined time, the pinching determining unit determines that the vehicle seat is continuously in the reverse load state.

4. The pinching detection apparatus of a vehicle seat according to claim 1,
    wherein on the lower side of the vehicle seat, a plurality of the load sensors are provided, and
    the reverse load determining unit determines whether or not the vehicle seat is in the reverse load state in each region in which each of the load sensors is provided.

5. The pinching detection apparatus of a vehicle seat according to claim 4, further comprising:
    an inclination estimation unit that estimates an inclination of the vehicle; and a threshold correcting unit that corrects a threshold used for determining the reverse load state for every region where the reverse load state is determined, based on an estimation result obtained by the inclination estimation unit.

6. The pinching detection apparatus of a vehicle seat according to claim 5,
wherein a correct amount of the threshold corrected by the threshold correcting unit is set in response to an inclined amount detected by the inclination estimation unit.

7. The pinching detection apparatus of a vehicle seat according to claim 2,
wherein when the reverse load state continues beyond a predetermined time, the pinching determining unit determines that the vehicle seat is continuously in the reverse load state.

8. A pinching detection apparatus of a vehicle seat comprising:
circuitry configured to:
determine whether or not a vehicle seat is in a reverse load state in which the vehicle seat is lifted upward based on a seat load detected by a load sensor provided on a lower side of the vehicle seat, and
determine that a foreign material is pinched on the lower side of the vehicle seat when determining that the vehicle seat is continuously in the reverse load state,
wherein when the vehicle seat is in the reverse load state for a predetermined ratio or more in a predetermined measurement period, the circuitry is configured to determine that the vehicle seat is continuously in the reverse load state by counting a continuing time of the reverse load state.

9. The pinching detection apparatus of a vehicle seat according to claim 8,
wherein when the reverse load state continues beyond a predetermined time, the circuitry is configured to determine that the vehicle seat is continuously in the reverse load state.

10. The pinching detection apparatus of a vehicle seat according to claim 8,
wherein a plurality of the load sensors are provided on the lower side of the vehicle seat, and
wherein the circuitry is configured to determine whether either or both of a total value and an average value of seat loads detected by the respective load sensors is below a predetermined threshold.

11. The pinching detection apparatus of a vehicle seat according to claim 10,
wherein when the reverse load state continues beyond a predetermined time, the circuitry is configured to determine that the vehicle seat is continuously in the reverse load state.

12. The pinching detection apparatus of a vehicle seat according to claim 8,
wherein on the lower side of the vehicle seat, a plurality of the load sensors are provided, and
the circuitry is configured to determine whether or not the vehicle seat is in the reverse load state in each region in which each of the load sensors is provided.

13. The pinching detection apparatus of a vehicle seat according to claim 12, wherein the circuitry is further configured to:
estimate an inclination of the vehicle, and
correct a threshold used to determine the reverse load state for every region where the reverse load state is determined, based on an estimation result of the inclination obtained by the circuitry.

14. The pinching detection apparatus of a vehicle seat according to claim 13,
wherein a correct amount of the threshold corrected by the circuitry is set in response to an inclined amount detected by the circuitry.

\* \* \* \* \*